July 14, 1931.   H. J. CAMERON   1,814,825
NONMETALLIC GEAR WHEEL AND METHOD OF MANUFACTURING THE SAME Filed Aug. 5, 1930

Inventor:
Hugh J. Cameron,
by Charles E. Mullan
His Attorney.

Patented July 14, 1931

1,814,825

UNITED STATES PATENT OFFICE

HUGH J. CAMERON, OF FORT WAYNE, INDIANA, ASSIGNOR TO GENERAL ELECTRIC COMPANY, A CORPORATION OF NEW YORK

NONMETALLIC GEAR WHEEL AND METHOD OF MANUFACTURING THE SAME

Application filed August 5, 1930. Serial No. 473,277.

This invention relates to non-metallic gears, composed of fibrous material held together by a synthetic resin, and to a method of softening or cushioning the surfaces of the teeth of these gears.

Gears of this type are generally noiseless, but it has been found in certain uses of these gears, particularly where the utmost quiet in the operation of the gears is desired, that a slight objectionable scraping or similar sound is produced sometimes by the meshing of the gears. This is especially true in the case wherein a small gear of this type meshes with a metal worm, an application met with, for example, in the case of the governor shaft drive for a phonograph.

The object of my invention is to provide an improved gear wheel of this type which will operate with the utmost quiet and to provide a method for producing such gears, and in order to point out what I believe to be novel and my invention, attention is directed to the following specification and the claims appended thereto.

In the drawings Fig. 1 is a view in perspective of the gear blank.

Figure 1:
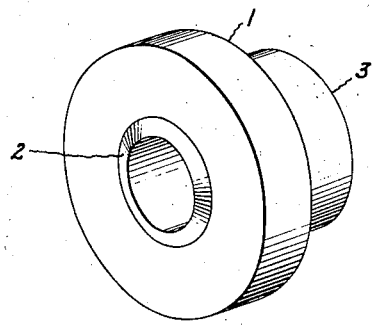
Figure 2:
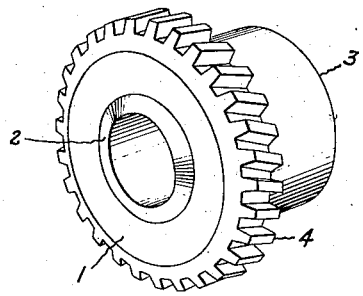
Fig. 2 is a view similar to Fig. 1, showing the gear blank with the teeth formed therein.

Referring to the drawings, 1 designates the gear blank. The gear teeth 4 are formed on the blank in any known manner and there is a bore in the blank through which passes the reduced end 2 of a metallic hub 3, the blank usually having a driving fit on the reduced end of the hub.

The blank is composed of a fibrous material cemented together by a synthetic resin, such as, for example, a condensation product of phenol and formaldehyde. The invention is particularly applicable to gears that are composed of a very light muslin, or cloth, not heavier than what is known as 6 ounce linen ducking, cemented together by a synthetic resin wherein the resin constitutes about 35% of the weight and the fibrous material the remainder. However, I desire it to be understood that I do not limit myself to the specific materials composing the gear or to the percentages by weight stated above.

Figure 3:
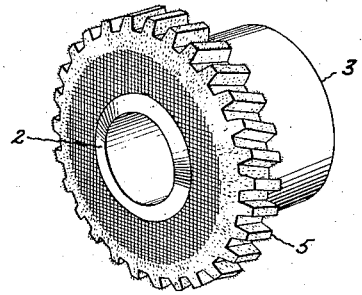
Fig. 3 is a view similar to Fig. 2 showing the teeth as they appear after they have been treated according to my invention.

I have found that the operation of the gear is improved, and the desired maximum quietness of operation is obtained, if the fibers used in the structure of the blank are caused to protrude from the surfaces of the teeth as shown at 5 in Fig. 3.

This protrusion of the fibers may be obtained by partially removing the hard resin at the surfaces of the teeth so as to leave the fibers in relief, thereby providing a very soft surface for the mating gear to ride on. The resin may be removed in any suitable manner. For example, I may accomplish the removal by dipping the gear in a solution which will dissolve the resin at the surfaces of the teeth, leaving the textile fibers exposed. For this purpose I have found an alkali solution to be satisfactory in the case of a gear wherein the fibrous material is united by a phenolic condensation product.

One specific process which I have found to be satisfactory in carrying out my invention comprises dipping the gear for about twelve minutes in a solution of caustic soda of about 25 to 30% concentration maintained at a temperature of about 98° C., after which it is removed and the excess caustic soda is neutralized in a 15% solution of sulphuric acid. The gear is then rinsed in boiling water, then in cold water, and again in boiling water until it is thoroughly heated. It is then removed and dried by means, for example, of an air blast, leaving the textile fibers exposed, or protruding from the surface of the teeth.

By my invention I provide a gear which, due to the soft surface provided for the teeth, operates with the utmost quietness thereby adapting the gear for the most exacting application. At the same time, the life of the gear is not adversely affected.

What I claim as new and desire to secure by Letters Patent of the United States, is:

1. In a gear of the type composed of fibrous material held together by a synthetic resin binder, a fiber material protruding from the surfaces of the teeth.

2. A gear of the type composed of fibrous material, held together by a synthetic resin binder, wherein the fibers used in the structure of the gear project from the surface of the teeth.

3. The method of treating the teeth of a gear of the type composed of fibrous material held together by a synthetic resin, to expose the fibers of said material, which consists in removing a portion of the resinous material at the surfaces of the teeth.

4. The method of treating the teeth of a gear of the type composed of fibrous material held together by a synthetic resin, to expose the fibers of said material, which consists in chemically removing a portion of the resinous material at the surfaces of the teeth.

5. The method of treating the teeth of a gear of the type composed of fibrous material held together by a synthetic resin, to expose the fibers of said material, which comprises removing a portion of the resinous material at the surfaces of the teeth by dissolving said resinous material in a caustic soda solution.

6. The method of treating the teeth of a gear of the type composed of fibrous material held together by a synthetic resin, to expose the fibers of said material, which comprises removing a portion of the resinous material at the surfaces of the teeth by dissolving said resinous material in a 25 to 30% caustic soda solution maintained at a temperature of about 98° C.

7. The method of treating the teeth of a gear of the type composed of fibrous material held together by a synthetic resin, to expose the fibers of said material, which comprises removing a portion of the resinous material at the surfaces of the teeth by dissolving said resinous material in a caustic soda solution, neutralizing the excess caustic soda in a solution of sulphuric acid, rinsing in water, and then drying.

In witness whereof, I have hereto set my hand this 31st day of July, 1930.

HUGH J. CAMERON.